United States Patent
Takagi et al.

(10) Patent No.: US 9,584,673 B2
(45) Date of Patent: Feb. 28, 2017

(54) DEVICE MANAGEMENT APPARATUS, DEVICE MANAGEMENT SYSTEM, RECORDING MEDIUM, AND DEVICE MANAGEMENT METHOD THAT REDUCE OBSTRUCTION WHEN SOLVING FAILURE CAUSED BY SKILL OF OPERATOR

(71) Applicant: Kyocera Document Solutions Inc., Osaka (JP)

(72) Inventors: Jumpei Takagi, Osaka (JP); Chika Tsuji, Osaka (JP); Daisuke Yoshida, Osaka (JP); Takeshi Nakamura, Osaka (JP); Takashi Nomura, Osaka (JP); Yuichi Obayashi, Osaka (JP); Katsuhiro Minoru, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/838,332

(22) Filed: Aug. 27, 2015

(65) Prior Publication Data
US 2016/0065752 A1 Mar. 3, 2016

(30) Foreign Application Priority Data
Aug. 27, 2014 (JP) .................................. 2014-172861

(51) Int. Cl.
*H04N 1/00* (2006.01)

(52) U.S. Cl.
CPC ..... *H04N 1/00037* (2013.01); *H04N 1/00029* (2013.01); *H04N 1/00061* (2013.01); *H04N 1/00076* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| 2007/0220365 A1* | 9/2007 | Castellani | ............... G06Q 10/00 |
| | | | 714/46 |
| 2010/0149571 A1* | 6/2010 | Thieret | .................. G03G 15/55 |
| | | | 358/1.13 |

FOREIGN PATENT DOCUMENTS

JP 2012-138001 A 7/2012

* cited by examiner

Primary Examiner — Andrew H Lam
(74) Attorney, Agent, or Firm — James Judge (57) ABSTRACT

A device management apparatus includes a communication processing circuit and a service support processing circuit. The communication processing circuit receives device state information transmitted from a first operator. The device state information indicates device state information of the electronic device. The first operator performs solution work to a failure of the electronic device. The service support processing circuit determines a category into which the device state information is classified from the received device state information. The service support processing unit searches a database for a second operator or a candidate for the second operator. The second operator has solved a failure belonging to the determined category. The database stores operator information including a solution result of a failure of each operator. The service support processing unit decides the searched second operator or the searched candidate for the second operator to assist or complement the solution work by the first operator.

6 Claims, 8 Drawing Sheets

DEVICE MANAGEMENT APPARATUS, DEVICE MANAGEMENT SYSTEM, RECORDING MEDIUM, AND DEVICE MANAGEMENT METHOD THAT REDUCE OBSTRUCTION WHEN SOLVING FAILURE CAUSED BY SKILL OF OPERATOR

INCORPORATION BY REFERENCE

This application is based upon, and claims the benefit of priority from, corresponding Japanese Patent Application No. 2014-172861 filed in the Japan Patent Office on Aug. 27, 2014, the entire contents of which are incorporated herein by reference.

BACKGROUND

Unless otherwise indicated herein, the description in this section is not prior art to the claims in this application and is not admitted to be prior art by inclusion in this section.

As a conventional device management apparatus, for example, like a certain technique, the following device management apparatus has been provided. The device management apparatus collects operating procedure information of a computer from a user as a customer from a remote location. If an error caused by the operating procedure occurs, the device management apparatus presents a similar operating procedure free from error to the user as a solution.

This technique presents a different operating procedure as a solution for the error based on the operating procedure of the computer. In view of this, this technique cannot present a solution for an error unrelated to the operating procedure, for example, an error based on a physical deterioration of the computer or a similar error.

In contrast to this, typically, it is known that a field service person (an operator) from a maintenance service provider visits an office for a user or a similar place to perform solution work for an error in a computer.

However, if the field service person has shallow experience and knowledge, even if the field service person finds the error in the computer, the field service person possibly cannot find the solution, failing to eliminate the error. Such problem occurs in not only the error in the computer but also possibly occurs when solving a failure of an electronic device including an image forming device such as a printer.

SUMMARY

A device management apparatus according to an aspect of the disclosure supports solution work for a failure of an electronic device. The device management apparatus includes a communication processing circuit and a service support processing circuit. The communication processing circuit receives device state information transmitted from a first operator. The device state information indicates a device state information of the electronic device. The first operator performs solution work to a failure of the electronic device. The service support processing circuit determines a category into which the device state information is classified from the received device state information. The service support processing unit searches a database for a second operator or a candidate for the second operator. The second operator has solved a failure belonging to the determined category. The database stores operator information including a solution result of a failure of each operator. The service support processing unit decides the searched second operator or the searched candidate for the second operator to assist or complement the solution work by the first operator.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

When the operator performs the solution work for the failure of the electronic device, an object of reducing a possibility of obstructing the solution of the failure depending on the skill of the operator is achieved as follows. The second operator who has solved a failure belonging to the category identical to that of the solution work for the failure performed by the first operator or the candidate for the second operator is decided to assist or complement the solution work of the failure performed by the first operator.
Embodiment 1

The following describes Embodiment 1, of the disclosure based on the drawings.

Figure 1:
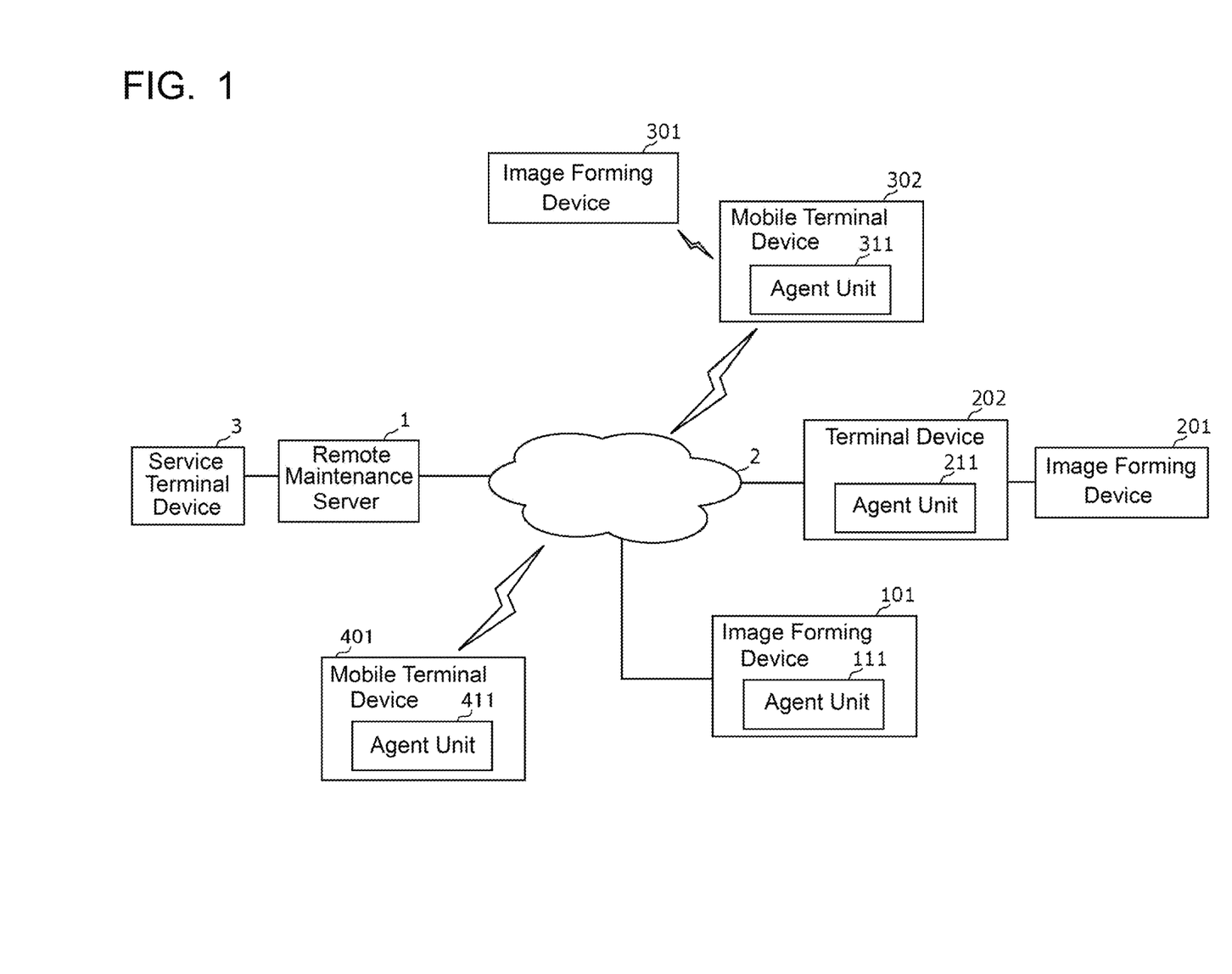
FIG. 1 illustrates a configuration of a device management system according to Embodiment 1, of the disclosure.

FIG. 1 illustrates a configuration of a device management system according to Embodiment 1, of the disclosure. In the device management system illustrated in FIG. 1, a plurality of image forming devices 101, 201, and 301 are installed in an office for a user as each customer of maintenance service or a similar place. A remote maintenance server 1 as the device management apparatus is installed at a maintenance service provider side. For the maintenance service, the remote maintenance server 1 obtains device state information from the plurality of image forming devices 101, 201, and 301.

The remote maintenance server 1 is connected to a network 2. The image forming device 101 is connected to the network 2. The image forming device 201 is connected to a terminal device 202 connected to the network 2. The image forming device 301 is stand-alone, not connected to the network 2. However, a mobile terminal device 302 is present near the image forming device 301. The mobile terminal device 302 ensures wireless communications with the image forming device 301 by short-range wireless communication. The mobile terminal device 302 can be wirelessly connected to the network 2. The mobile terminal device 302 is a communication terminal carried and operated by a first field service person as a first operator who visits the installation location of the image forming device 301 such as the office for the user.

The mobile terminal device 302 incorporates a short-range communication device and a network communication device. The short-range communication device ensures short-range wireless communications such as Bluetooth (a trademark) and infrared communications. The network communication device ensures network communications via the network 2 by mobile phone line, public wireless Local Area Network (LAN), or a similar network.

With this embodiment, a mobile terminal device 401 with an identical configuration to the mobile terminal device 302 can be wirelessly connected to the network 2. The mobile terminal device 401 is a communication terminal carried and operated by a second field service person as a second operator who is located at a different place from the first field service person.

The image forming device 101, the terminal device 202, the mobile terminal device 302, and the mobile terminal device 401, which are connectable to the network 2, each include agent units 111, 211, 311, and 411. The agent units 111, 211, 311, and 411 perform data communications with the remote maintenance server 1 via the network 2. The agent units 111, 211, 311, and 411 each obtain the device state information. The device state information indicates current states of the image forming devices 101, 201, and 301. The agent units 111, 211, 311, and 411 have a function to transmit the device state information to the remote maintenance server 1 via the network 2 (a snapshot function).

The agent units 111 and 211 in the image forming devices 101 and 201 automatically obtain the device state information and transmit the device state information to the remote maintenance server 1.

The agent unit 311 in the mobile terminal device 302 obtains the device state information from the image forming device 301 with the short-range communication device based on an operation by the first field service person. The agent unit 311 transmits the obtained device state information to the remote maintenance server 1 via the network 2 with a network communication device.

At this time, to eliminate the failure of the image forming device 301, the first field service person also performs an operation to request solution information. When detecting the operation, the agent unit 311 in the mobile terminal device 302 transmits the request of the solution information to the remote maintenance server 1 together with the device state information.

This embodiment describes the example where the first field service person visits the office for the user of the image forming device 301 or a similar place. However, similarly, the first field service person visits the installation location of the image forming device 101 and the installation location of the image forming device 201. The agent unit 311 in the mobile terminal device 302 can also obtain the device state information from the image forming device 101 and the image forming device 201 and transmit the request of the solution information to the remote maintenance server 1.

Additionally, in the mobile terminal device 401, similar to the mobile terminal device 302, when the second field service person visits the installation location of the image forming device 101, 201, or 301, the agent unit 411 can also obtain the device state information from the image forming device 101, 201, or 301 and transmit the request of the solution information to the remote maintenance server 1. Note that FIG. 1 illustrates the state where the field service person having the mobile terminal device 401 does not visit any installation location. Each field service person carries the mobile terminal device 401; however, for convenience, the following omits descriptions of field service persons other than the first and second field service persons.

The device state information includes states of event logs detected and held by the device and consumables in the device (a toner, a drum, or a similar component), various counter information, or similar information. The event logs include error logs and debug logs.

A service terminal device 3 is connected to the remote maintenance server 1. The service terminal device 3 is installed at, for example, a service center for the maintenance service provider. A third field service person in a remote center uses the service terminal device 3. Based on an operation by the third field service person, the service terminal device 3 transmits the acquisition instruction of the device state information, a browse request of the obtained device state information, or a similar request to the remote maintenance server 1.

The above-described agent units 111 and 211 also have a function to display a message screen on operation panels of the image forming devices 101 and 201 based on a message display instruction from the remote maintenance server 1 (a digital notebook function). Then, based on the operation by the third field service person in the center, the service terminal device 3 transmits the message display instruction or a similar instruction to the remote maintenance server 1.

Figure 2:
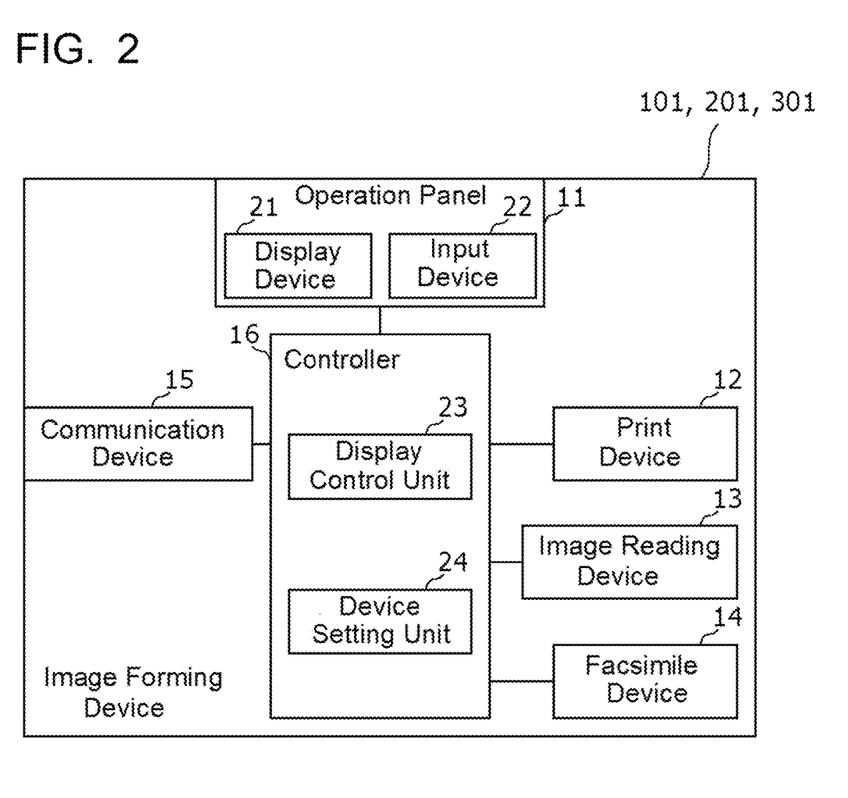
FIG. 2 illustrates a basic configuration of an image forming device according to Embodiment 1.

FIG. 2 illustrates the basic configuration of the image forming devices 101, 201, and 301 in FIG. 1.

The image forming devices 101, 201, and 301 are electronic devices, here, multi-functional peripherals. The image forming devices 101, 201, and 301 include an operation panel 11, a print device 12, an image reading device 13, a facsimile device 14, a communication device 15, and a controller 16.

The operation panel 11 is located on an upper surface side of a housing of the image forming device 101, 201, or 301 or a similar location. The operation panel 11 includes a display device 21 and an input device 22. The display device 21 displays screens for the user. The input device 22 accepts an operation by the user. The display device 21 is, for example, a liquid crystal display. The input device 22 is a touch panel or a similar device achieving software keys together with the display device 21 as well as hardware keys.

A print device 12 is an internal device that includes a circuit that prints images based on image data by, for example, electrophotographic method.

The image reading device 13 is an internal device that includes a circuit that optically reads a document image from a document to create image data of the document image.

The facsimile device 14 is an internal device such as a facsimile board that transmits facsimile signals of document images and receives the facsimile signals to create the image data of the document images from the facsimile signals.

The communication device 15 is a network interface, a modem, a peripheral interface such as a universal serial bus (USB), a short-range wireless communication interface such as a Bluetooth (a trademark), or a similar interface.

The controller 16 has a computer. The controller 16 loads programs from a storage device or a recording medium (not illustrated), executes the programs on the computer, and functions as various processing units. The execution of the program causes the controller 16 of this embodiment to function as a display control unit 23 and a device setting unit 24.

The display control unit 23 is a circuit that controls the screen display on the display device 21 of the operation panel 11. The device setting unit 24 is a circuit that sets, for example, setting values specified by user operation to the operation panel 11 to various setting items.

The controller 16 of the image forming device 101 or 201 each functions also as the respective agent unit 111 or 211 in FIG. 1. The agent units 311 and 411 in FIG. 1 are each achieved by the functions of the controllers of the mobile terminal devices 302 and 401.

Figure 3:
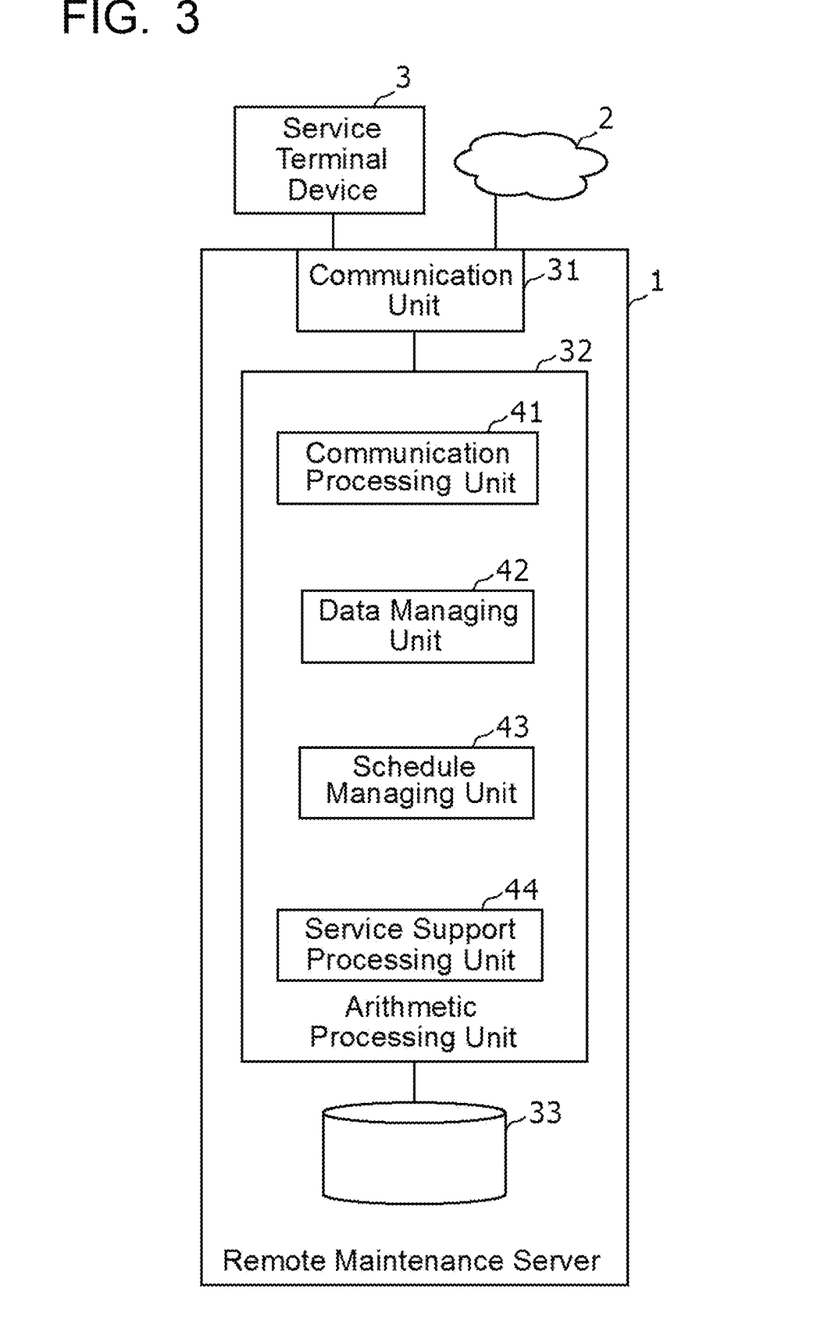
FIG. 3 illustrates a configuration of a remote maintenance server according to Embodiment 1.

FIG. 3 illustrates the configuration of the remote maintenance server 1 in FIG. 1. The remote maintenance server 1 includes a communication unit 31, an arithmetic processing unit 32, and a database 33.

The communication unit 31 includes a communication circuit for data communications with the service terminal device 3 and a communication circuit for data communications via the network 2.

The arithmetic processing unit 32 has the computer. The arithmetic processing unit 32 loads the device management program from the storage device or the recording medium (not illustrated) to a random access memory (RAM). The execution of the device management program by a central processing unit (CPU) causes the arithmetic processing unit 32 to function as various processing units. The arithmetic processing unit 32 of this embodiment functions as a communication processing unit 41, a data managing unit 42, a schedule managing unit 43, and a service support processing unit 44.

The database 33 stores the solution information on a failure associating the solution information to a keyword related to the failure of the image forming devices 101, 201, and 301. This solution information is text data and image data. The service person, a technical expert, or a similar person registers the solution information with the database 33 from the service terminal device 3, the mobile terminal device 302, or a similar device.

The database 33 stores operator information including solution results of the failures of the image forming devices 101, 201, and 301 of each service person. The operator information includes contact address information of the service persons, for example, e-mail addresses and phone numbers for the service persons having the mobile terminal devices 302 and 401.

The solution results included in the operator information are the count of solutions and the solution time of the failure in this embodiment. For example, when the service person has solved a failure occurred in the image forming devices 101, 201, and 301, the count of solutions is a value of accumulating the count of solutions depending on a category into which device state information (events) of the image forming devices 101, 201, and 301 possibly causing a failure are classified. The solution time is an average solution time of each category. The category is a component, a function, or a similar factor related to the device state information.

The communication processing unit 41 is a circuit that performs data communications with the service terminal device 3 using the communication unit 31. Additionally, the communication processing unit 41 is a circuit that performs data communications with the agent units 111, 211, 311, and 411 via the network 2. In particular, the communication processing unit 41 receives the device state information transmitted from the agent unit 311 or 411 based on the operation by the field service person.

The data managing unit 42 is a circuit that stores the device state information, which is received from the agent units 111, 211, 311, or 411, in the storage device (not illustrated), the database, or a similar device.

The schedule managing unit 43 is a circuit that transmits the acquisition instruction of the device state information to the agent unit 111 or 211, which becomes the automatic acquisition target of the device state information, corresponding to the image forming device 101 or 201. When succeeding the acquisition of the device state information, the communication unit 31 and the communication processing unit 41 receive the device state information from the agent unit 111 or 211.

When the communication processing unit 41 receives the request of the solution information together with the device state information, the service support processing unit 44 is a circuit that detects a keyword from the device state information. Using the detected keyword as a search key, the service support processing unit 44 is a circuit that searches the database 33 for the solution information corresponding to the detected keyword. The service support processing unit 44 is a circuit that causes the communication processing unit 41 to transmit the solution information found by the search to the agent unit 311, which has transmitted the request of the solution information. This ensures presenting the solution information to the first field service person who performs solution work for the failure.

If the solution information cannot be appropriately presented, that is, the solution information cannot be found or the failure cannot be solved with the transmitted solution information, the service support processing unit 44 determines a category into which the device state information causing the failure is classified from the device state information received by the communication processing unit 41. The service support processing unit 44 searches the database for the second field service person who has solved the failure belonging to the determined category or the candidate. This embodiment searches the candidate for the second field service person.

If the failure cannot be solved with the solution information transmitted from the service support processing unit 44, based on the operation by the first field service person, the agent unit 311 of the mobile terminal device 302 needs to transmit a request for assistance or complement by the second field service person.

The request for assistance or complement can also be transmitted instead of the request of the solution information. In this case, the service support processing unit 44 starts searching the candidate for the second field service person without searching the solution information or performing a similar operation.

The service support processing unit 44 determines the searched candidate for the second field service person to assist or complement the solution work by the first field service person.

When the service support processing unit 44 has found the plurality of candidates for the second field service person by the search, the candidates are ranked as the candidates for the second field service person by one of or both the count of solutions and the solution time of the failure in the category. Whether one of or both the count of solutions and the solution time is used, the priority between them, or a similar condition can be arbitrarily set.

This embodiment uses both the count of solutions and the solution time. This embodiment ranks the candidates for the second field service person in an order from the large count of solutions and short solution time. The service support processing unit 44 may obtain a status of each service person, such as location information, in work, and in standby, from the agent units 311 and 411. This may be accommodated to rank the candidates for the second field service person.

Based on the decision on the candidate for the second field service person, the service support processing unit 44 notifies the agent unit 311 of the mobile terminal device 302 for the first field service person of the contact address information, such as the list, the phone numbers, and the e-mail addresses of the ranked candidates for the second field service person.

The service support processing unit 44 receives new solution information input to the agent unit 311 by the first field service person from the agent unit 311 after the transmission of the solution information or similar timing and registers the new solution information with the database 33. Then, for example, the database 33 registers the solution information associating the solution information to the above-described detected keyword, the device state information itself, the category, or a similar element.

The data managing unit 42 associates the received device state information with the identification information of the image forming device or similar information and stores the device state information. Upon the request from the service terminal device 3 for the maintenance service provider, the data managing unit 42 transmits the device state information to the service terminal device 3.

Furthermore, when receiving the request of the solution information, the service support processing unit 44 may detect a keyword from the device state information, which has already been stored in the data managing unit 42 (the device state information of the image forming device specified by the request of the solution information). Using the detected keyword as the search key, the service support processing unit 44 may search the database 33 for the solution information corresponding to the detected keyword. The service support processing unit 44 may cause the communication processing unit 41 to transmit the solution information found by the search to the agent unit 311 that has transmitted the request of the solution information.

Figure 4:
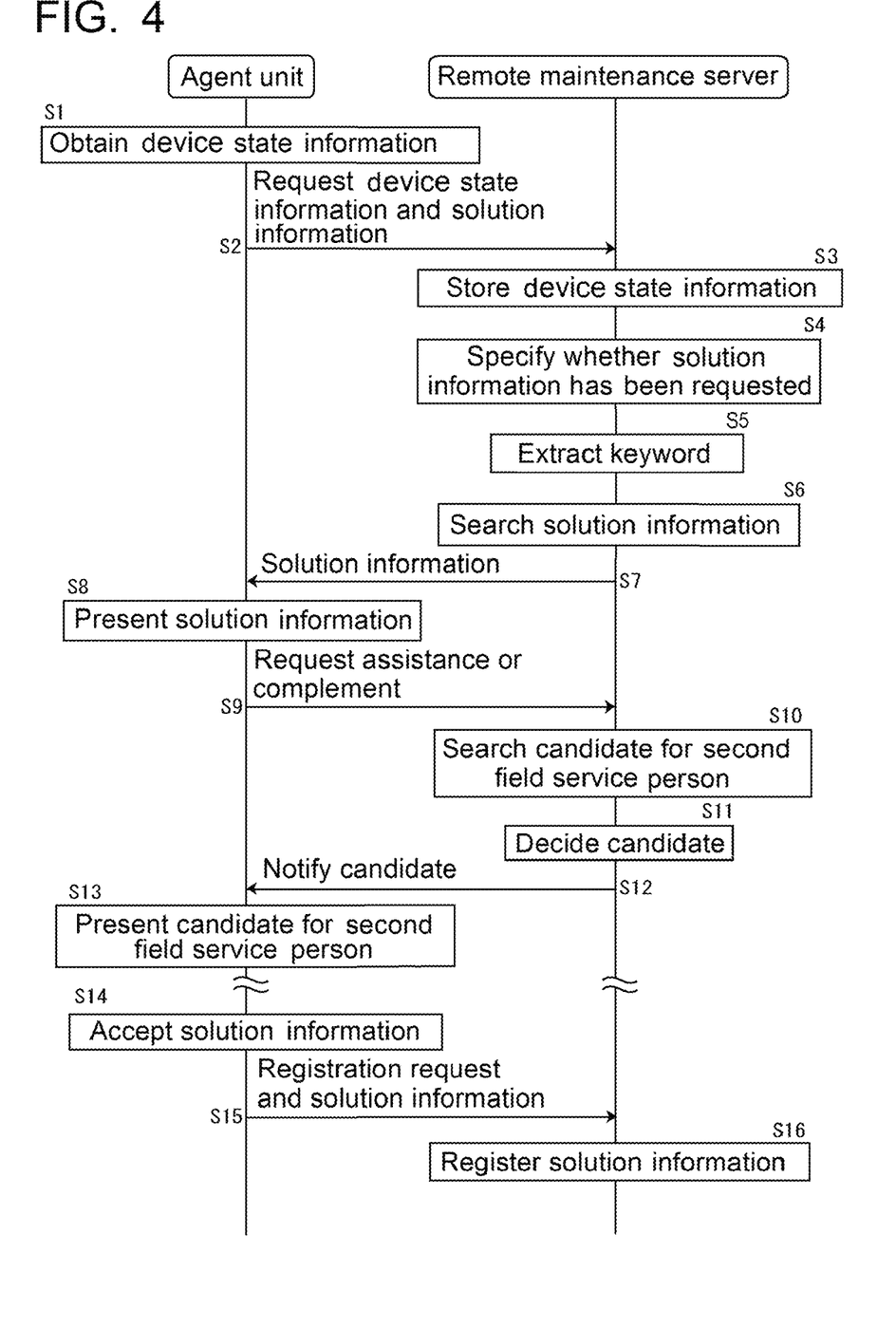
FIG. 4 illustrates processes for device management according to Embodiment 1.

The following describes processes for the device management in this embodiment. FIG. 4 describes processes for the device management of the embodiment of the disclosure.

For periodic inspection of the image forming device 301 or when a failure occurs in the image forming device 301, the first field service person carries the mobile terminal device 302 and visits the installation location of the image forming device 301. The first field service person operates the mobile terminal device 302 to cause the mobile terminal device 302 to obtain the device state information of the image forming device 301. At this time, the agent unit 311 performs data communications with the image forming device 301 to obtain the device state information of the image forming device 301 (Step S1).

For the periodic inspection and when knowing the solution for the failure in the case of failure, the first field service person operates the mobile terminal device 302 to transmit the device state information of the image forming device 301 to the remote maintenance server 1 without requesting the solution information. In the remote maintenance server 1, when the communication processing unit 41 receives the device state information, the data managing unit 42 stores the received device state information.

Meanwhile, if not knowing the solution for the failure in the case of failure, the first field service person operates the mobile terminal device 302 to transmit the request of the solution information to the remote maintenance server 1 together with the device state information of the image forming device 301 (Step S2).

In the remote maintenance server 1, when the communication processing unit 41 receives the device state information and the request of the solution information, the data managing unit 42 stores the received device state information (Step S3). The service support processing unit 44 determines whether the data managing unit 42 has received the request of the solution information together with the device state information or not (Step S4).

When the data managing unit 42 has received the request of the solution information together with the device state information, the service support processing unit 44 extracts a keyword from the device state information (Step S5). The keyword is, for example, a system error, an error code such as a service call, jam location information, and consumable exhaustion information.

The service support processing unit 44 searches the database 33 for the solution information using the keyword as the search key (Step S6). The communication processing unit 41 transmits the solution information found by the search as a response to the request of the solution information (Step S7). The case where the solution information cannot be found will be described later.

If the data managing unit 42 has not received the request of the solution information together with the device state information, the service support processing unit 44 does not perform the processes at Steps S5 to S7.

When the agent unit 311 of the mobile terminal device 302 receives the solution information via the network 2, the agent unit 311 causes the display device of the mobile terminal device 302 to display the solution information (Step S8). When finding a plurality of pieces of solution information by the search, the display device displays the plurality of pieces of solution information.

If the first field service person cannot find the solution for the failure by this, the first field service person sees the solution information displayed on the mobile terminal device 302 to ensure knowing the solution. Then, the first field service person performs the solution to eliminate the failure. At this time, when the elimination of the failure involves setting change, the first field service person explains the fact to the user and then changes the setting.

For example, the first field service person may include the firmware version of the image forming device 301 in the device state information to include version information of a firmware and a list of firmware that can eliminate the failure identified from the firmware version in the solution information.

If the failure cannot be solved with the presented solution information, the first field service person operates the mobile terminal device 302 to transmit the request for assistance or complement by the second field service person from the agent unit 311 to the remote maintenance server 1 (Step S9).

Upon the received request, the service support processing unit 44 of the remote maintenance server 1 searches the database 33 for the candidate for the second field service person who has solved the failure belonging to the category into which the device state information is classified (Step S10).

If the solution information cannot be found at Step S6, the service support processing unit 44 does not perform the processes at Steps S7 to S9 but performs the process at Step S10.

The searched candidate for the second field service person is decided for assistance or complement of the solution work by the first field service person (Step S11). At this time, when the service support processing unit 44 has found the plurality of candidates for the second field service person by the search, as described above, the candidates are ranked as the candidates for the second field service person by the count of solutions and the solution time of the failure.

Figure 5A:
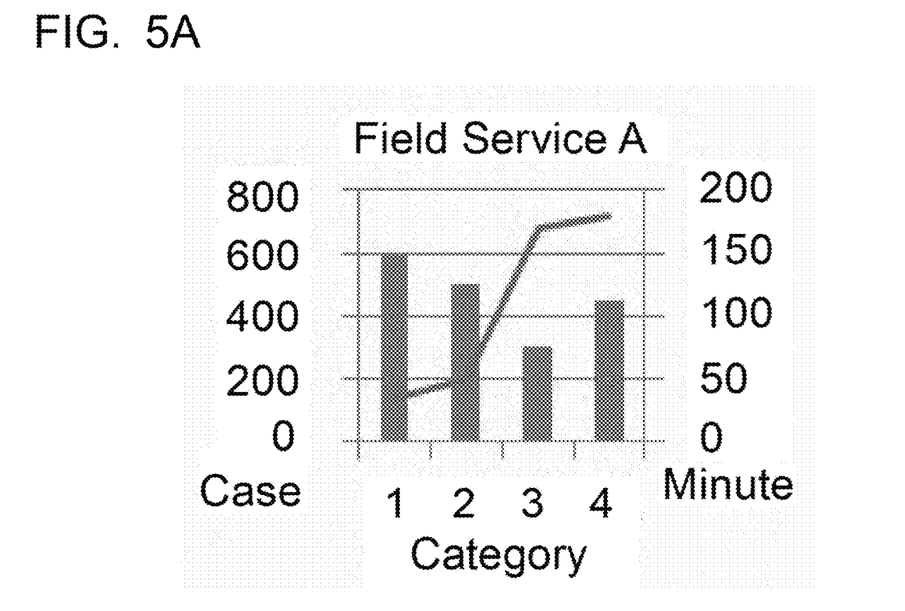
FIGS. 5A to 5C illustrate an example of a count of solutions and solution time of a failure in each category.
Figure 5B:
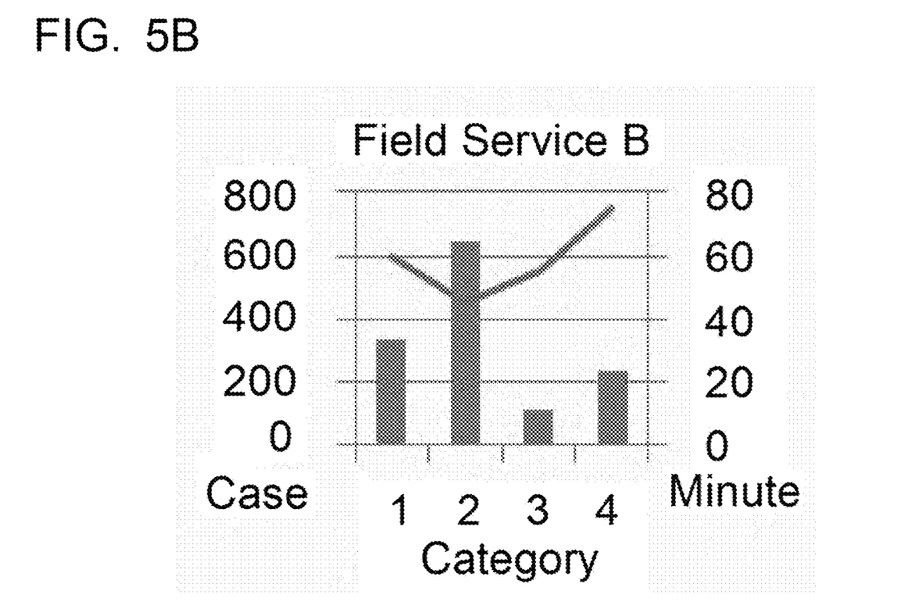
Figure 5C:
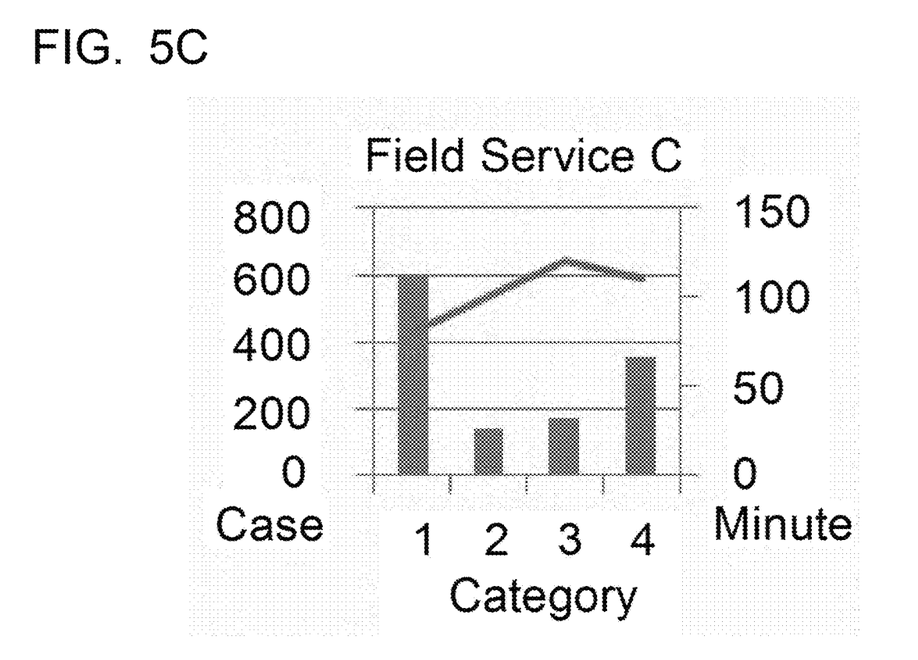

FIGS. 5A to 5C illustrate an example of the count of solutions and the solution time of a failure in each category. FIGS. 5A to 5C show solution statistics in each field service persons A to C as different candidates. In FIGS. 5A to 5C, the bar charts indicate the count of solutions and the line graphs indicate the solution time. The vertical axis indicates the count of solutions to the left in the drawing and indicates the solution time to the right in the drawing. The horizontal axis indicates different categories 1, to 4.

As illustrated in FIGS. 5A to 5C, for example, assume the case where the device state information belongs to the category 1, and the field service persons A to C are found as the candidates by the search. From the aspect of the count of solutions, the rankings of the field service persons A and C whose count of solutions is relatively large are high. Further, from the aspect of the solution time, the ranking of the field service person A whose solution time is relatively fast is high.

Accordingly, to solve the failure related to the category 1, the candidate for the second field service person can be decided with the ranking of the field service persons A, C, and B, the order estimated as having higher skill and solution ability among the candidates. The ranking may be decided with different criterion. For example, the criterion may be a distance from the installation location of the image forming device 301. Additionally, the candidate with the highest ranking can be decided as the second field service person.

Upon decision of the candidate for the second field service person, the service support processing unit 44 transmits the list of the ranked second field service persons to the mobile terminal device 302 for the first field service person together with the contact address information such as the phone numbers and e-mail addresses (Step S12).

Therefore, the agent unit 311 of the mobile terminal device 302 causes the display device of the mobile terminal device 302 to display (present) the received list (Step S13). While checking the list received by the mobile terminal device 302, the first field service person can select the second field service person for the assistance or the complement of the solution work of the failure.

The selected second field service person can obtain and check the device state information of the image forming device 301 at the mobile terminal device 401. To obtain the device state information, for example, it is only necessary that the agent unit 311 of the mobile terminal device 302 transmits the device state information of the image forming device 301 itself or the link information of the system to the mobile terminal device 401 based on the operation by the first field service person. Alternately, the mobile terminal device 302 may transmit the selection information of the second field service person to the remote maintenance server 1. The service support processing unit 44 may transmit the device state information of the image forming device 301 itself or the link information of the system to the mobile terminal device 401.

Thereafter, for example, the first field service person contacts the second field service person to hear the solution. Alternatively, the second field service person moves to the installation location of the image forming device 301, thus ensuring assistance or complement of the solution work of the failure by the first field service person.

When performing the solution and eliminating the failure, the first field service person can register new solution information (namely, solution information different from the original solution information) with the database 33.

To register the new solution information with the database 33, the field service person inputs the new solution information as text data or similar data to the mobile terminal device 302 together with the solution time. When inputting the text data or similar data, a text or similar data can be selected from the list or similar data or the text or similar data can be directly input through the operation of the mobile terminal device 302. When the agent unit 311 of the mobile terminal device 302 accepts the new solution information and solution time information (Step S14), the agent unit 311 transmits the new solution information and the solution time information to the remote maintenance server 1 together with the registration request via the network 2 (Step S15).

In the remote maintenance server 1, when the communication processing unit 41 receives the new solution information and the solution time information together with the registration request, the service support processing unit 44 associates the new solution information and the solution time information with the corresponding device state information and registers the new solution information and the solution time information with the database 33 (Step S16).

As described above, the remote maintenance server 1 of this embodiment includes the communication processing unit 41 and the service support processing unit 44. The communication processing unit 41 receives device state information transmitted from the first field service person. The device state information indicates the device state information of the image forming device 301. The first field service person performs solution work to the failure of the image forming device 301 or a similar device. The service support processing unit 44 determines a category into which the device state information is classified from the received device state information. The service support processing unit 44 searches the database 33 for the second field service person or the candidate for the second field service person. The second field service person has solved the failure belonging to the determined category. The database 33 stores operator information including a solution result of a failure of each field service person. The service support processing unit 44 decides the searched second field service person or candidate for the second field service person to assist or complement the solution work by the first field service person.

Accordingly, the remote maintenance server 1 of this embodiment ensures causing the second field service person who has solved the failure classified into the identical category to assist or complement the solution work of the failure in execution by the first field service person. This ensures reducing a possibility of obstructing the solution of the failure depending of the skill of the field service person.

In the remote maintenance server 1 of this embodiment, the service support processing unit 44 searches the database 33 for the solution information of the failure corresponding to the received device state information. The database 33 stores solution information for each failure. The service support processing unit 44 provides the searched solution information to the first field service person. The service support processing unit 44 decides the second field service person or the candidate for the second field service person when appropriate solution information cannot be provided.

Therefore, this embodiment presents the solution information to the first field service person to advance solving the failure by himself/herself. This shortens duration of visit of the first field service person at the installation location of the image forming device 301. This also reduces the count of visits of the field service person to the installation location. Moreover, even if appropriate solution information cannot be provided, this ensures the assistance or complement by the second field service person. This ensures reducing a possibility of obstructing the solution of the failure depending on the skill of the field service person.

This embodiment advances solving the failure by the first field service person himself/herself. Finally, the second field service person assists or complements the solution work by the first field service person. This also ensures efficiently performs on-the-job training for the first field service person.

According to the decision of the second field service person or the candidate for the second field service person, the service support processing unit 44 notifies the first field service person of the contact address information of the second field service person or the candidate for the second field service person.

Therefore, with this embodiment, the first field service person can select the second field service person and quickly contact the second field service person. This ensures quickly completing the solution work assisted or complemented by the second field service person.

The device management system that includes the remote maintenance server 1 of this embodiment includes the image forming devices 101, 201, and 301, the database 33, and the agent units 111, 211, 311, and 411. The database 33 stores the operator information including the solution results of the failures for each field service person. The agent units 111, 211, 311, and 411 transmit the device state information to the remote maintenance server 1 based on the operation by the first field service person. The device state information indicates the device state information of the image forming device 301 or a similar device.

Accordingly, this embodiment can achieve the device management system that can reduce a possibility of obstructing the solution of the failure depending on the skill of the field service person.

With the device management system of this embodiment, the field service person actually has solved the failure registers the new solution information with the database 33. This ensures providing further accurate solution information to other field service persons.

The device management program of this embodiment achieves the functions of the respective units of the remote maintenance server 1. This ensures providing the operations and effects similar to the remote maintenance server 1.

The device management method of this embodiment is as follows. The agent unit 311 or a similar unit as the device state information transmitting unit transmits device state information based on the operation by the first field service person. The device state information indicates the device state information of the image forming device 301 or a similar device. The first field service person performs the solution work to the failure of the image forming device 301 or a similar device. The communication processing unit 41 as the communication processing means receives the device state information transmitted from the agent unit 311. The service support processing unit 44 as the device managing unit searches the database 33 for the second field service person or the candidate for the second field service person. The second field service person has solved a failure in a category. Into the category, the device state information corresponding to the received device state information is classified. The database 33 stores operator information including the solution result of the failure of each field service person. The service support processing unit 44 decides the searched second field service person or candidate for the second field service person to assist or complement the solution work by the first field service person.

Accordingly, this embodiment can achieve the device management method using the device management system that can reduce a possibility of obstructing the solution of the failure depending on the skill of the field service person.

Embodiment 2

Figure 6:
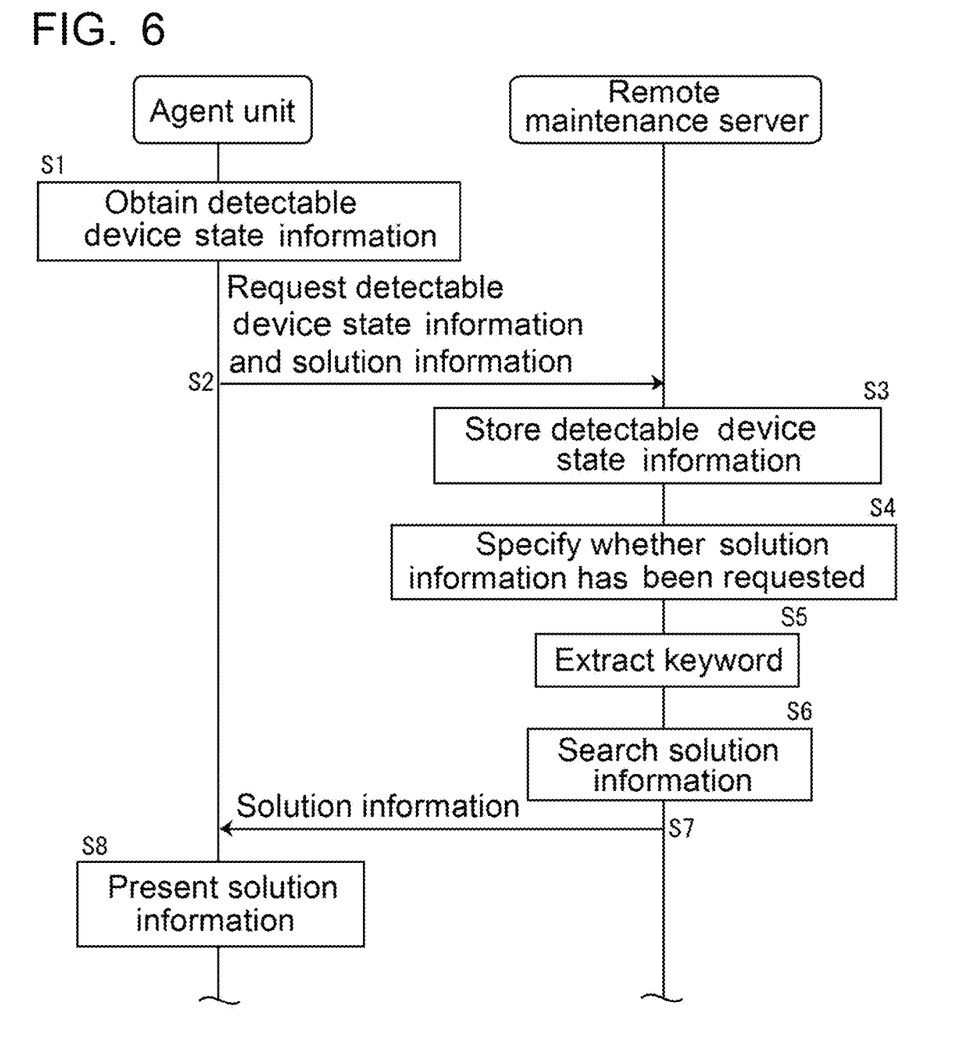
FIG. 6 illustrates processes of device management according to Embodiment 2, of the disclosure.
Figure 7:
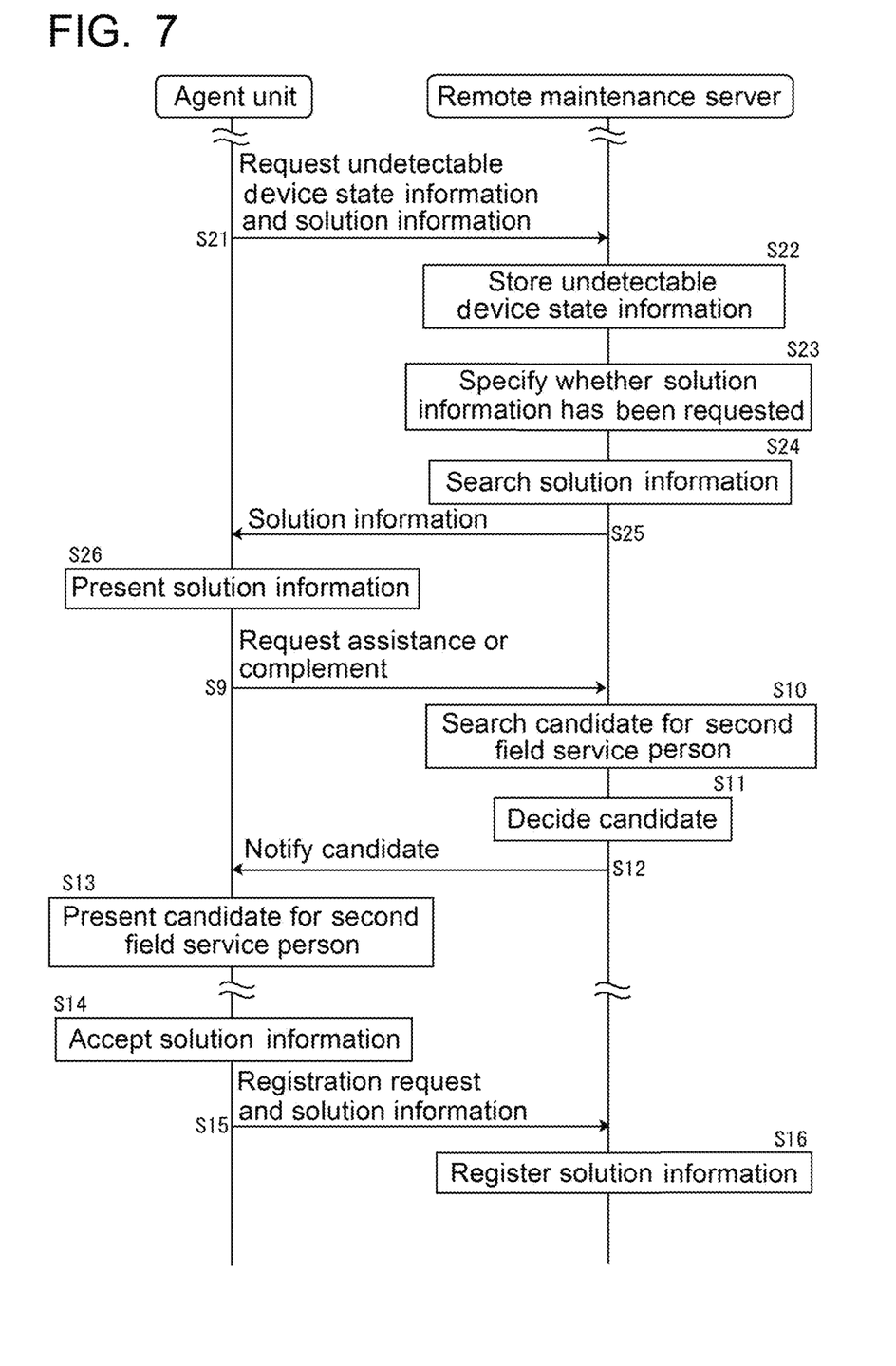
FIG. 7 illustrates the processes of the device management according to Embodiment 2.

FIGS. 6 and 7 describe processes of the device management according to Embodiment 2, of the disclosure. Since identical to Embodiment 1, the following describes the configuration of the device management system of this embodiment with reference to FIG. 1 to FIG. 3.

If the device management system of this embodiment cannot properly present the solution information of the failure based on an undetectable device state information, which is undetectable by the image forming device 301, to the first field service person, the device management system decides the second field service person or the candidate for the second field service person for the solution work of the failure based on the undetectable device state information.

Specifically, this embodiment presents the solution information of the failure based on a detectable device state information, which is detectable by the image forming device 301, to the first field service person. When the failure cannot be solved, this embodiment presents the solution information of the failure based on the undetectable device state information of the image forming device 301. If the failure remains unsolved after that, this embodiment decides the second field service person or the candidate for the second field service person for the undetectable device state information.

Accordingly, the database 33 of this embodiment stores the solution information for both the detectable device state information and the undetectable device state information. The undetectable device state information is device state information, for example, including a physical damage and deterioration of a paper feed roller, a paper cassette, or a similar component in which the service person cannot recognize the failure unless actually observing the component.

The solution information for the detectable device state information corresponds to the solution information of Embodiment 1. The database 33 associates the solution information with the keyword related to the failure of the image forming device 101, 201, or 301 and stores the solution information as the solution information for the failure.

The database 33 stores the solution information for the undetectable device state information as the solution information of the failure. The solution information of the failure includes the solution information of failure based on the undetectable device state information actually solved by the field service person and the original undetectable device state information (events and causes). In the case of the failure, since the detectable device state information detected at that time is present, the solution information for the undetectable device state information is also associated to the detectable device state information.

During the processes of the device management of this embodiment, as illustrated in FIG. 6, first, this embodiment performs the processes from Steps S1 to S8 similar to Embodiment 1, in the solution work of the failure based on the detectable device information. The first field service person performs the solution work of the failure based on the detectable device state information of the image forming device 301 based on the presented solution information.

If the failure cannot be solved with the presented solution information, the first field service person begins the solution work of the failure based on the undetectable device state information. In this solution work, the first field service person observes the image forming device 301 to identify the undetectable device state information.

As illustrated in FIG. 7, the first field service person operates the mobile terminal device 302 to transmit the request of the solution information together with the specified undetectable device state information from the agent unit 311 to the remote maintenance server 1 (Step S21).

In the remote maintenance server 1, when the communication processing unit 41 receives the undetectable device state information and the request of the solution information, the data managing unit 42 stores the received undetectable device state information (Step S22). The service support processing unit 44 determines whether the request of the solution information has been received together with the undetectable device state information or not (Step S23).

When the communication processing unit 41 has received the request of the solution information together with the undetectable device state information, the service support processing unit 44 searches the database 33 for the solution information using the undetectable device state information as the keyword (Step S24). The communication processing unit 41 transmits the solution information found by the search as a response to the request of the solution information (Step S25). Step S24 uses the undetectable device state information itself as the keyword. However, the keyword may be extracted from the detectable device state information. Alternately, the service support processing unit 44 may determine the category to which the undetectable device state information belongs from the undetectable device state information and may use the category as the keyword.

When the agent unit 311 of the mobile terminal device 302 receives the solution information via the network 2, the agent unit 311 causes the display device of the mobile terminal device 302 to display (present) the received solution information (Step S26).

Accordingly, when the first field service person sees the solution information displayed on the mobile terminal device 302, the first field service person can know the solution of the failure based on the undetectable device state information. Then, the first field service person performs the solution to eliminate the failure.

If the failure cannot be solved with the presented solution information, the first field service person operates the mobile terminal device 302 to transmit the request for assistance or complement by the second field service person from the agent unit 311 to the remote maintenance server 1 (Step S9).

This performs the processes similar to Steps S9 to S16 of Embodiment 1, in the solution work of the failure based on the undetectable device state information. This ensures causing the second field service person to assist or complement the solution work by the first field service person. When eliminating the failure, the first field service person can associate the new solution information and solution time information to the corresponding detectable device state information and undetectable device state information and register the new solution information and solution time information.

If the solution information cannot be found at Step S24, the processes at Steps S25, S26, and S9 are not performed, but the process at Step S10 is performed.

As described above, this embodiment decides the second field service person or the candidate for the second field service person if appropriate solution information cannot be provided after presenting the solution information for the failure based on the detectable device state information, which is detectable by the image forming device 301 to the first field service person, and after presenting the solution information for the failure based on the undetectable device state information of the image forming device 301.

Accordingly, this embodiment ensures advancing the solution of the failure by the first field service person himself/herself from both the detectable device state information and the undetectable device state information. This ensures reducing a possibility of obstructing the solution of the failure depending on the skill of the field service person with more certainty.

Moreover, if appropriate solution information cannot be provided consequently, the second field service person or the candidate for the second field service person is decided. This ensures the assistance or the complement by the second field service person. This ensures reducing a possibility of obstructing the solution of the failure depending of the skill of the field service person.

Besides, in this embodiment as well, the operations and effects similar to Embodiment 1, can also be achieved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device management apparatus for supporting work to resolve malfunctioning of an electronic device, the apparatus comprising:
a communications processing circuit for receiving device-status information indicating device status of the electronic device, transmitted on the part of a first worker who carries out work resolving malfunctioning of the electronic device; and
a service support processing circuit configured to
determine from the received device-status information a category classifying the device-status information,
search a database storing, on a per-worker basis, worker information including malfunction-resolution results belonging to each of device-status categories, to find either a second worker or a second-worker candidate who has resolved a malfunction belonging to the determined device-status classifying category,
rank found second workers or second-worker candidates for either assisting or complementing resolution work by the first worker, decide at least the highest-ranking second worker or second-worker candidate, search a database storing method-of-resolution information on a per-malfunction basis to find information on resolving a malfunction corresponding to the received device-status information, provide on the part of the first worker found resolution information, and decide a second worker or a second-worker candidate when the service support processing circuit is unable to provide appropriate method-of-resolution information.

2. The device management apparatus according to claim 1, wherein:

the device-status information includes detectable device-status information when the electronic device is able to detect specific device-status information of the electronic device itself, the detectable device-status information indicating detectable device-status information detectable by the electronic device, the device-status information including undetectable device-status information, the undetectable device-status information indicating undetectable device-status information undetectable by the electronic device; and the service support processing circuit is further configured to decide a second worker or a second-worker candidate when the service support processing circuit is unable to provide appropriate resolution information after providing on the part of the first operator resolution information for a malfunction corresponding to the detectable device-status information transmitted from the first operator, and after providing on the part of the first operator solution information for a malfunction corresponding to the undetectable device-status information transmitted from the first operator.

3. The device management apparatus according to claim 1, wherein according to a decision of the second worker or the second-worker candidate, the service support processing circuit notifies the first operator of contact address information on the second worker or the second-worker candidate.

4. A device management system, comprising:

an electronic device;

a remote maintenance server, the remote maintenance server being a device management apparatus according to claim 1;

a database storing, on a per-worker basis, the worker information including malfunction-resolution results; and an agent unit that transmits device state information to the remote maintenance server based on an operation by the first worker, the device-status information indicating device-status information on the electronic device.

5. A non-transitory computer-readable recording medium storing a device management program controlling a device management apparatus for supporting work to resolve malfunctioning of an electronic device, the device management program causing a computer to function as:

a communications processing circuit for receiving device-status information indicating device status of the electronic device, transmitted on the part of a first worker who carries out work resolving malfunctioning of the electronic device; and a service support processing circuit configured to determine from the received device-status information a category classifying the device-status information, search a database storing, on a per-worker basis, worker information including malfunction-resolution results belonging to each of device-status categories, to find either a second worker or a second-worker candidate who has resolved a malfunction belonging to the determined device-status classifying category, rank found second workers or second-worker candidates for either assisting or complementing resolution work by the first worker, decide at least the highest-ranking second worker or second-worker candidate, search a database storing method-of-resolution information on a per-malfunction basis to find information on resolving a malfunction corresponding to the received device-status information, provide on the part of the first worker found resolution information, and decide a second worker or a second-worker candidate when the service support processing circuit is unable to provide appropriate method-of-resolution information.

6. A device management method for supporting work to resolve malfunctioning of an electronic device, the method comprising:

a device state information transmitting circuit's transmitting, based on an operation by a first worker who carries out work resolving malfunctioning of the electronic device, device-status information indicating status of the electronic device;

a communication processing circuit's receiving the device-status information transmitted from the device state information transmitting circuit;

a device management circuit's searching a database storing, on a per-worker basis, worker information including malfunction-resolution results belonging to each of device-status categories, to find either a second worker or a second-worker candidate who has resolved a malfunction in a category classifying the device-status information corresponding to the received device-status information;

the device management circuit's ranking found second workers or second-worker candidates for either assisting or complementing resolution work by the first worker;

the device management circuit's deciding at least the highest-ranking second worker or second-worker candidate; and a service support processing circuit's searching a database storing method-of-resolution information on a per-malfunction basis to find information on resolving a malfunction corresponding to the received device-status information, providing on the part of the first worker found resolution information, and deciding a second worker or a second-worker candidate when the service support processing circuit is unable to provide appropriate method-of-resolution information.

* * * * *